United States Patent [19]

Edwards

[11] Patent Number: 5,010,291
[45] Date of Patent: Apr. 23, 1991

[54] SINGLE QUADRANT CHOPPER TIMING CONTROL CIRCUIT FOR DISCONTINUOUS CURRENT

[75] Inventor: Charles W. Edwards, Monroeville, Pa.

[73] Assignee: Westinghouse Electric Corp., Pittsburgh, Pa.

[21] Appl. No.: 529,844

[22] Filed: May 29, 1990

[51] Int. Cl.$^5$ .............................................. H02M 7/44
[52] U.S. Cl. ...................................... 323/222; 363/41; 363/95; 363/97; 363/124
[58] Field of Search ................... 363/95, 41, 97, 124; 323/222

[56] References Cited

U.S. PATENT DOCUMENTS

| | | | |
|---|---|---|---|
| 4,032,833 | 6/1977 | Ibamoto et al. | 363/78 |
| 4,220,989 | 9/1980 | Perilstein . | |
| 4,354,223 | 10/1982 | Turnbull . | |
| 4,415,846 | 11/1983 | Dewan . | |
| 4,562,357 | 12/1985 | Miyazawa . | |
| 4,666,020 | 5/1987 | Watanabe . | |
| 4,672,303 | 6/1987 | Newton | 323/222 |
| 4,792,887 | 12/1988 | Bernitz et al. | 363/89 |
| 4,823,247 | 4/1989 | Tamoto . | |
| 4,827,151 | 5/1989 | Okado . | |

*Primary Examiner*—Peter S. Wong
*Assistant Examiner*—Bruce Dunn

[57] ABSTRACT

A single quadrant chopper timing control circuit is used with unidirectional power flow chopper arrangements in a power inverter to maintain current oscillation between positive and negative threshold levels of a hysteresis controller. The single quadrant chopper timing control circuit creates a mimic current when the current in the power inverter becomes zero or less. The mimic current allows the unidirectional power arrangement to continue oscillating so that there is little or no discontinuity in the timing. The device will continue to operate and provide a high bandwidth to ensure that the device will function during an overload or load dump condition.

7 Claims, 2 Drawing Sheets

SINGLE QUADRANT CHOPPER TIMING CONTROL CIRCUIT FOR DISCONTINUOUS CURRENT

BACKGROUND OF THE INVENTION

(1) Field of the Invention

The present invention is directed to a single quadrant chopper timing control circuit; and more particularly to a timing control circuit used in unidirectional power flow chopper systems. The present invention maintains current oscillation between positive and negative threshold levels of a hysteresis controller by employing a mimic current to generate a mimic current. The mimic current mimics a negative current in a hysteresis controller in the chopper system. This mimic current permits continuous oscillation of the chopper current when a unidirectional power inverter is employed. The mimic current reduces ripple in the output and ensures that there is little or no discontinuity during oscillation when the current reaches a level less than or equal to zero.

(2) Description of the Related Art

Hysteresis controllers are used to control the operation of choppers. As is well known, hysteresis controllers oscillate between upper and lower current threshold levels. Generally, hysteresis controllers have a very wide bandwidth. Wide bandwidth allows tight control of a DC link voltage even when heavy loads are applied to or released from the chopper system.

Hysteresis controllers are used in chopper systems designed to supply either unidirectional or bidirectional current. In a unidirectional power flow arrangement used, for example, in a solar power system including a solar inverter, power will flow from the solar panels/batteries to the inverter, but will not flow in the reverse direction. In a bidirectional power flow arrangement, power flows from the solar panels/batteries to the inverter and from the inverter to the batteries.

In the case of unidirectional power flow, the current cannot reach the lower threshold of the hysteresis controller when the current becomes negative. Thus, once the current applied to the hysteresis controller reaches zero, the hysteresis controller will stop oscillating and the chopper is no longer controlled. A bidirectional power flow arrangement does not have the problem of discontinued oscillation since the current can reverse and reach both the upper and lower threshold levels of the hysteresis controller.

Prior art systems attempt to overcome the problem of a hysteresis controller stopping oscillation when a demand current is negative by using a current regulator and associated control circuitry. These systems, however, have a narrow bandwidth. Thus, these systems cannot satisfactorily control the current provided by a chopper.

SUMMARY OF THE INVENTION

It is an object of the present invention to provide a single quadrant chopper timing control circuit which will mimic a negative current in a hysteresis controller to permit continuous oscillation when a unidirectional chopper is employed.

It is another object of the present invention to provide a single quadrant chopper timing control circuit which will ensure that there is little or no discontinuity when the chopper current reaches zero or less than zero.

It is yet another object of the present invention to provide a single quadrant chopper timing control circuit which has an increased bandwidth so that a direct current link to an inverter can be better controlled to insure that the inverter will operate during an overload or a load dump condition.

Yet another object of the present invention is to provide a single quadrant chopper timing control circuit which provides a mimic current which allows the current that appears to the hysteresis controller to oscillate between the threshold levels.

The above and other objects of the present invention are achieved by providing a single quadrant chopper timing control circuit for discontinuous current including a summer for summing the current demand signal, a feedback current and a mimic current from a mimic integrator, and outputting a summed current. A hysteresis controller receives the summed current and outputs a hysteresis signal. A first comparator is provided for receiving a current, and determining whether the current is below a predetermined value. A logic circuit receives the hysteresis signal and the signal from the first comparator and outputs a logic signal. In addition, the present invention includes a mimic integrator which receives the logic signal and outputs a mimic current when the current from the first comparator is below a predetermined value.

These objects, together with other objects and advantages which will be subsequently apparent, reside in the details of construction and operation as more fully hereinafter described and claimed, reference being had to the accompanying drawings forming a part hereof, wherein like reference numerals refer to, like parts throughout.

DESCRIPTION OF THE PREFERRED EMBODIMENT

Figure 1:
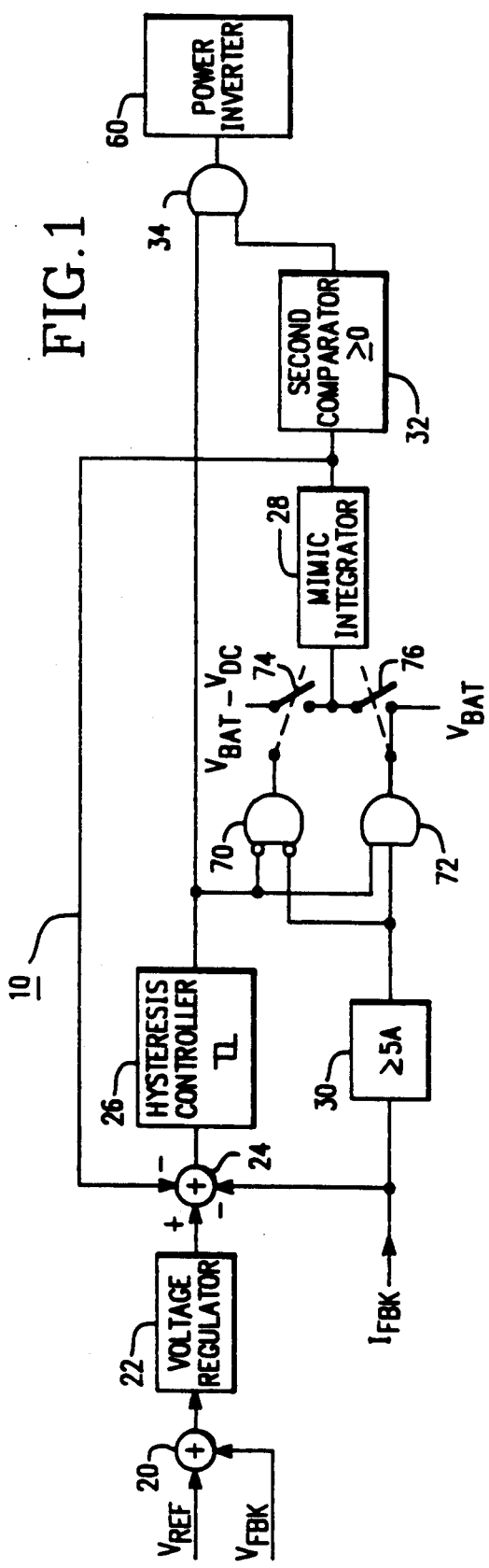
FIG. 1 is a block diagram of a single quadrant chopper timing control circuit according to an embodiment of the present invention.

FIG. 1 is a block diagram of a single quadrant chopper timing control circuit 10 according to the present invention. In FIG. 1, a first summer 20 generates a difference between a reference voltage $V_{REF}$ and a feedback voltage $V_{RBK}$. The reference voltage $V_{REF}$ sets the output voltage of an inverter 60. The output voltage can be, for example, 400 volts DC. The feedback voltage $V_{FBK}$ is proportional to the inverter 60 output voltage. The feedback voltage $V_{FBK}$ is provided by a differential amplifier (not shown).

The summed voltage output from the first summer 20 is input to a voltage regulator 22. The voltage regulator 22 generates a current demand signal corresponding to the amount of current that is needed to maintain the DC link voltage as specified by the reference voltage $V_{REF}$. This current demand signal is output from the voltage regulator 22.

Figure 2:
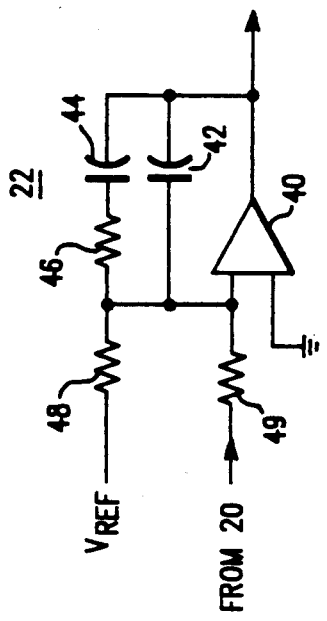
FIG. 2 is a circuit diagram of a voltage regulator employed in the FIG. 1 circuit.

FIG. 2 is a circuit diagram of the voltage regulator 22. The voltage regulator 22 in FIG. 2 can include, for example, a first operational amplifier 40. The voltage regular is a typical circuit which includes two capacitors 42 and 44 and two resistors 46 and 48 connected in series between one of the capacitors and a first input terminal. A resistor 49 is provided on an input terminal to the first operational amplifier 40. In a preferred embodiment, the first operational amplifier can be, for example, a TL074 amplifier manufactured by Texas Instruments; the first capacitor 42 can be .001 $\mu f$; the second capacitor 44 can be 1 $\mu f$; the resistor 46 can be 200 K$\Omega$; the resistor 48 can be 20 K$\Omega$; and the resistor 49 can be 10 K$\Omega$.

The output of the first operational amplifier 40 (i.e., current demand signal) is input to a second summer 24 shown in FIG. 1 together with a feedback current $I_{FBK}$ and a mimic current. The output from the second summer 24 is input to a hysteresis controller 26.

Figure 3:
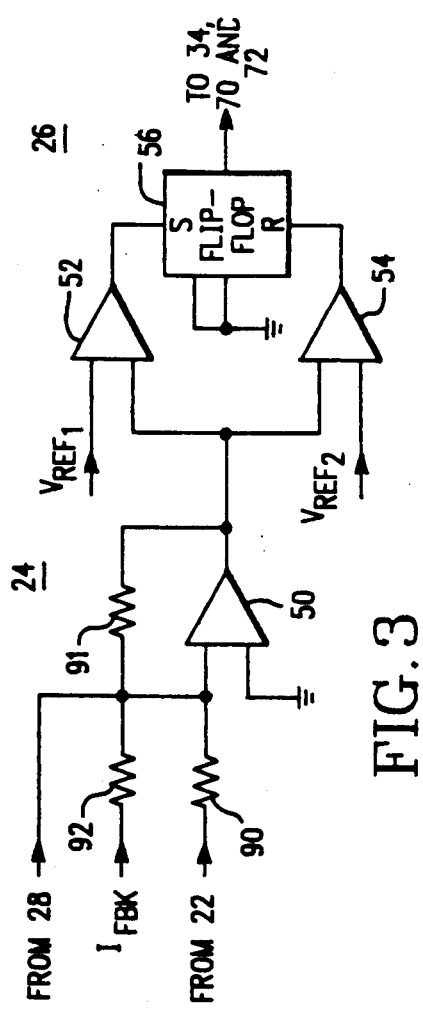
FIG. 3 is a circuit diagram of a hysteresis controller em in the FIG. 1 circuit.

FIG. 3 is a circuit diagram of one embodiment of the second summer 24 and the hysteresis controller 26 shown in FIG. 1. In FIG. 3, a second operational amplifier 50 functions as the second summer 24 shown in FIG. 1. The operational amplifier 50 is a typical circuit including a resistor 90 connected to receive the output from the second summer 24, a resistor 91 and a resistor 92. In a preferred embodiment, the resistors 90 and 92 can have values of 49.9 k$\Omega$; the resistor 91 can have a value of 249 K$\Omega$; the operational amplifier can be a TL074 amplifier manufactured by Texas Instruments.

A third comparator 52 compares the reference voltage $V_{REF1}$ and the output from the second operational amplifier 50. A fourth comparator 54 compares the output from the second operational amplifier 50 and a reference voltage $V_{REF2}$. $V_{REF1}$ and $V_{REF2}$ are arbitrarily set reference voltages.

The output of the third comparator 52 sets a flip-flop 56, and the output of the fourth comparator 54 resets the flip-flop 56. In a preferred embodiment, the comparators 52 and 54 can be LM339 comparators manufactured by National Semiconductor; and the flip-flop 56 can be a 4013 CMOS manufactured by Motorola.

Figure 4:
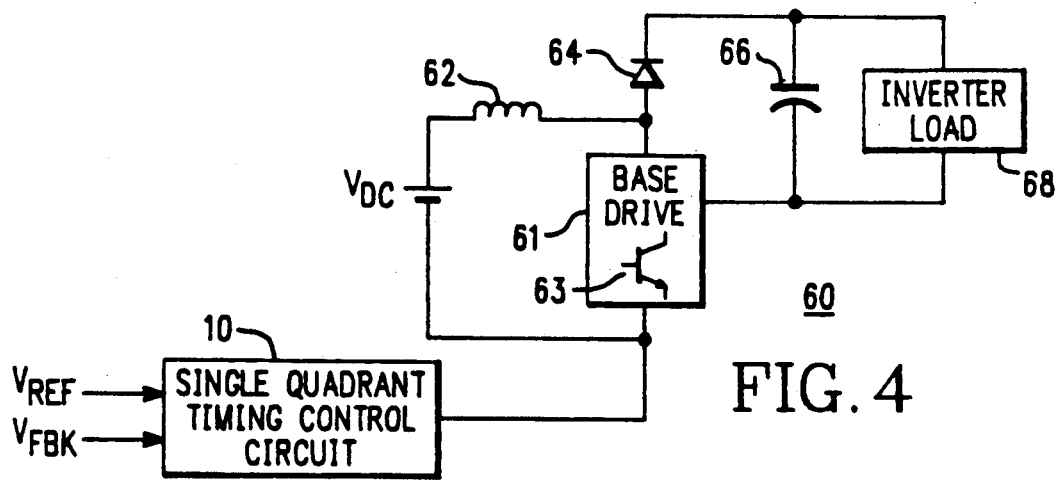
FIG. 4 is a block diagram of a power inverter which employs the single quadrant chopper timing control circuit of the present invention.

In FIG. 4, the single quadrant timing control circuit 10 shown in FIG. 1 is used in a power inverter 60. The hysteresis controller 26 determines the switching state of a chopper transistor 63 in the power inverter 60. When the chopper transistor 63 is ON, current builds up in a chopper inductor 62 until it reaches an upper hysteresis level. When the upper hysteresis level is reached, the chopper transistor 63 is turned OFF and energy is output through a chopper diode 64 to a DC link capacitor 66 having an inverter load 68 connected thereto. When the chopper transistor 63 reaches a low hysteresis level, the hysteresis controller 26 turns the chopper transistor 63 ON again. The chopper diode 64 prevents negative current from flowing into the power inverter 60. Therefore, when the current level provided by the hysteresis controller 26 is sufficiently low, the mimic integrator 28 of the present invention begins to operate.

Figure 5:
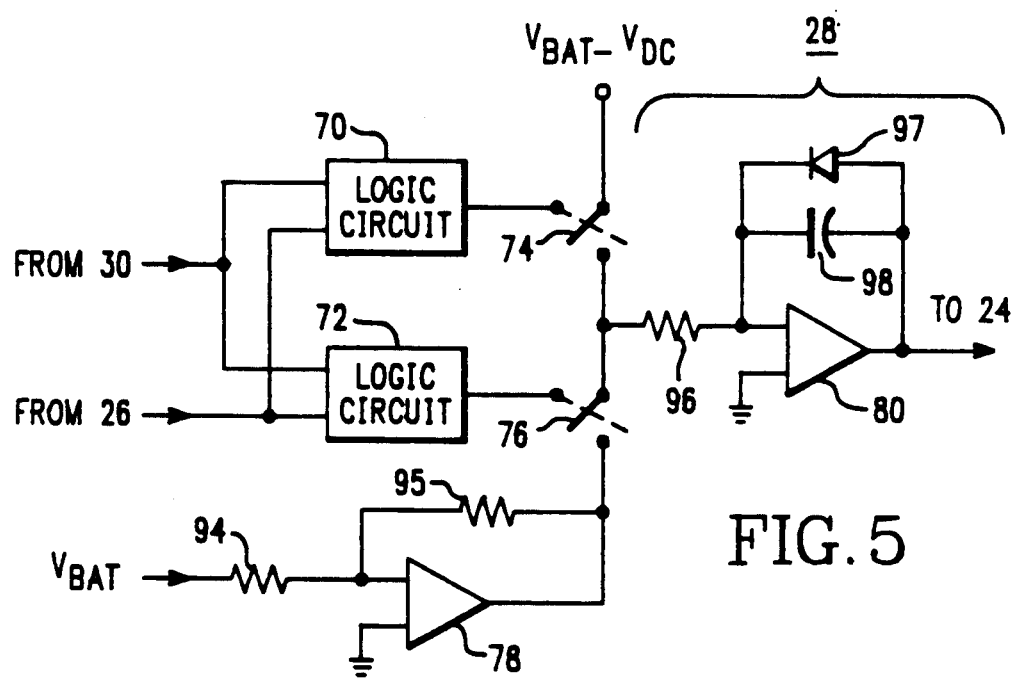
FIG. 5 is a circuit diagram of a mimic integrator employed in the FIG. 1 circuit.

As shown in FIG. 5, the mimic integrator 28 is connectable to a logic circuit 72 through a first switch 76 and a resistor 96. First and second logic circuits 70 and 72 receive the output from the hysteresis controller 26 and output respective logic signals. The logic signals are input to first and second switches 74 and 76. In a preferred embodiment, the switches can be HI201 analog switches manufactured by Harris Corporation.

The mimic integrator 28 integrates one of the logic signals provided via the switches 74 and 76. The mimic integrator 28 provides a mimic current based on the received logic signals and a signal received from a third operational amplifier 78. The third operational amplifier 78 is a typical circuit including resistors 94 and 95. A fourth operational amplifier 80 is connected to a connection node between the first and second switches 74 and 76 and a second terminal connected to ground. The fourth operational amplifier is a typical circuit which includes a diode 97 connected in parallel with a capacitor 98. In a preferred embodiment, the operational amplifiers 78 and 80 can be TL074 amplifiers manufactured by Texas Instruments; the resistors 94, 95 and 96 can have a resistance of 10 K$\Omega$; the diode 97 can be an 1N914B diode manufactured by Texas Instruments; and the capacitor 98 can have a capacitance .0068 $\mu f$.

Figure 6:
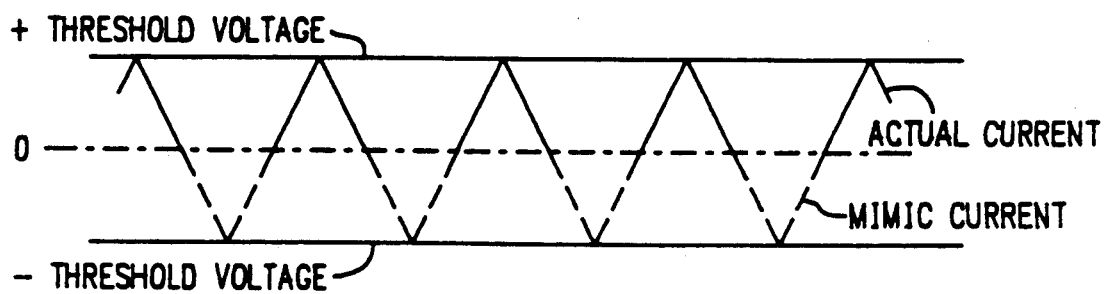
FIG. 6 is a waveform diagram of the current provided by the single quadrant timing control circuit of FIG. 1 and a mimic current generated within the FIG. 1 circuit.

FIG. 6 is a waveform diagram of the actual current provided by the single quadrant timing control circuit 10 (FIG. 1) and a mimic current. The operation of the mimic integrator 28 (FIG. 1) is explained using the FIG. 6 waveforms. The mimic integrator 28 mimics the current signal as shown by the dotted mimic current in FIG. 6.

The mimic integrator 28 turns ON when the feedback current $I_{FBK}$ (actually provided by the chopper) is, for example, less than 5 amps (essentially zero). When the current is less than 5 amps, the mimic integrator 28 operates to integrate the difference between a DC link voltage and the battery voltage. That is, the circuit 10 mimics a current so that the hysteresis controller 26 receives a bipolar current. The device acts as if it is a bidirectional power flow arrangement rather than a unidirectional power flow arrangement.

When the feedback current $I_{FBK}$ is below zero (in this case below 5 amps is considered to be essentially zero) the second switch 76 is turned ON and the output of the mimic integrator 28 ramps up until the 5 ampere threshold is reached. When the 5 ampere threshold is reached it turns ON the chopper transistor 63 in the base drive 61 and disables the mimic integrator 28. The chopper inductor 62 in the power inverter 60 then resumes control as shown by the solid line in FIG. 6 when the current is above, in this instance, 5 amperes.

The state of the switches 74 and 76 (FIG. 5) determines whether the mimic integrator 28 integrates toward the threshold or away from the threshold. For example, when the current in the device is below, for example, the 5 amp threshold, the first switch 74 is ON and the mimic current ramps toward the lower threshold. When the second switch 76 is ON the mimic current ramps up toward the 5 amp threshold. The switches can be, for example, analog switches.

A second comparator 32 (FIG. 1) receives the output of the mimic integrator 28 and, along with the logic gate 34, turns the chopper transistor 63 ON or OFF. If the output from the mimic integrator 28 is greater than zero and the threshold of the hysteresis controller 26 is greater than zero, the chopper transistor 63 in the base drive 61 will turn ON and the mimic integrator 28 is clamped to a positive value slightly greater than zero. Ideally, when the mimic integrator 28 is operating the power inverter 60 input to the second summer 24 should be zero volts. When the power inverter 60 is ON, the mimic integrator 28 input to the second summer 24 should be zero volts. Therefore, one of feedback signals input to the second summer 24 has a zero value.

The mimic current from the mimic integrator 28 allows the actual current in the hysteresis controller to appear to be oscillating between threshold levels. When this mimic current is used in a chopper having a unidirectional power flow arrangement, the actual current in the device will continuously oscillate and will maintain control in a manner similar to that of the bidirectional power flow arrangement. That is, the mimic current allows the hysteresis controller 26 to continuously operate so that a direct current link to the power inverter 60 can be controlled.

The present invention allows a high bandwidth based on the current value to be maintained over that of circuits using fixed timing references. This results in good dynamic response during an overload or load dump condition.

The foregoing is considered as illustrative only of the principles of the invention. Further, since numerous modifications and changes will readily occur to those skilled in the art, it is not desired to limit the invention to the exact construction and applications shown and described, and accordingly, all suitable modifications and equivalents may be resorted to, falling within the scope of the invention and the appended claims and their equivalents.

I claim:

1. A single quadrant chopper timing control circuit of providing discontinuous current, comprising:
   summer means for receiving and summing a current demand signal, a feedback current, and a mimic current, and for outputting a summed current responsive to the current demand signal, the feedback current and the mimic current;
   hysteresis controller means for receiving the summed current and outputting a hysteresis signal responsive to the summed current;
   first comparator means for receiving a current, for determining whether the current is below a predetermined value, and for outputting a signal responsive to said comparison;
   logic means for receiving the hysteresis signal and the signal from said first comparator means, for performing a logic operation, and for outputting a logic signal; and
   mimic integrator means for receiving and integrating the logic signal and the signal from said first comparator means and for outputting the mimic current when the current from said first comparator means is below the predetermined value.

2. A single quadrant chopper timing control circuit according to claim 1, further comprising:
   a summer circuit for receiving and summing a reference voltage and a feedback voltage and for outputting a summed voltage;
   regulator means outputting the current demand signal responsive to the summed voltage; and
   second comparator means for receiving the mimic current and outputting an enabling signal if the mimic current is greater than or equal to zero.

3. A single quadrant chopper timing control circuit as claimed in claim 2, wherein said logic means respectively comprise:
   a first logic gate connected to receive the signal output from said first comparator means and the hysteresis signal from said hysteresis controller means and outputting a logic signal; and
   a second logic gate connected to receive the signal output from said first comparator means and the hysteresis signal from said hysteresis controller means and outputting a logic signal.

4. A single quadrant chopper timing control circuit according to claim 3, wherein said voltage regulator means comprises a first operational amplifier connected to receive the reference voltage.

5. A single quadrant chopper timing control circuit as claimed in claim 4, wherein said hysteresis controller means comprises:
   a second operational amplifier, operatively connected to receive the output from said voltage regulator means, outputting a signal responsive to the output from said voltage regulator;
   a third comparator, operatively connected to receive the output from said second operational amplifier and operatively connected to receive the reference voltage, outputting a signal responsive to the output from said second operational amplifier and the reference voltage;
   a fourth comparator, operatively connected to receive the output from said second operational amplifier and operatively connected to receive the reference voltage, outputting a signal responsive to the output from said second operational amplifier; and
   a flip-flop operatively connected to receive the outputs from said third and fourth comparators and outputting a signal.

6. A single quadrant chopper timing control circuit as claimed in claim 5, further comprising:
   first and second switching means, respectively connected to receive the output signals from said first and second logic gates, for opening and closing in dependence upon the output signal from said first and second logic gates and outputting respective logic signals; and
   a third operational amplifier having a first terminal operatively connected to receive a battery voltage, having a second terminal connected to ground, and having an output connected to said second switching means, wherein said logic means receives the output from said flip-flop, and wherein said mimic integrator comprises:
   a fourth operational amplifier, operatively connected to a connection node between said first and second switching means, for outputting the mimic current responsive to the outputs from said first and second switching means.

7. A single quadrant chopper timing control circuit for providing discontinuous current, comprising:
   first summer means for summing a reference voltage and a feedback voltage and outputting a summed voltage;
   voltage regulator means for receiving the summed voltage and outputting a current demand signal;
   second summer means, for summing the current demand signal, a feedback current, and a mimic current, and outputting a summed current;
   hysteresis controller means for receiving the summed current from said second summer means and outputting a hysteresis signal;
   first comparator means for receiving a current, determining whether the current is below a predetermined value, and outputting a signal;

logic means for receiving the hysteresis signal and the signal from said first comparator means and outputting a logic signal;

mimic integrator means for receiving the logic signal and the signal from said first comparator means and for outputting a mimic current when the current from said first comparator means is below the predetermined value, the mimic current being input to said second summer means; and second comparator means for receiving the mimic current and outputting an enabling signal if the mimic current is greater than or equal to zero.

* * * * *